United States Patent
Halsall et al.

[15] 3,652,341
[45] Mar. 28, 1972

[54] METHOD OF MAKING A DRY CHARGED BATTERY

[72] Inventors: Vincent Michael Halsall, Bayside; Edward Norman Mrotek, Greendale, both of Wis.

[73] Assignee: Globe-Union Inc., Milwaukee, Wis.

[22] Filed: May 12, 1970

[21] Appl. No.: 36,662

[52] U.S. Cl. ............................................136/176, 136/33
[51] Int. Cl. ..................................H01m 7/00, H01m 35/30
[58] Field of Search ..............................136/33, 76, 34, 176

[56] References Cited

UNITED STATES PATENTS

| | | | |
|---|---|---|---|
| 1,816,035 | 7/1931 | Woodbridge | 136/176 |
| 3,038,018 | 6/1962 | Tiegel | 136/33 |

FOREIGN PATENTS OR APPLICATIONS

| | | | |
|---|---|---|---|
| 5,307 | 12/1927 | Australia | 136/176 |

Primary Examiner—Donald L. Walton
Attorney—John Phillip Ryan, Glenn A. Buse, Donald D. Denton and David T. Terry

[57] ABSTRACT

A charged storage battery having improved low temperature activation performance characteristics upon the addition of electrolyte is made by installing assembled battery elements into the container cell compartments; electrically connecting the battery elements; filling the cell compartments with the forming electrolyte, with or without the cover installed; forming the battery elements into a fully charged state; removing about 70 to about 97 (preferably about 77 to 87) weight per cent of the forming acid, based upon the total weight of the forming acid in the battery after formation, by applying an accelerative force (preferably a centrifugal force) to the battery; and installing means to seal the battery against the ingress of air into the cell compartments. In a preferred embodiment, the low temperature activation performance of the battery is further improved by allowing the battery elements to stand in the forming electrolyte for a time period after the forming step and then applying a boost charge to the battery elements prior to removing the forming acid.

15 Claims, No Drawings

METHOD OF MAKING A DRY CHARGED BATTERY

BACKGROUND OF THE INVENTION

1. Field of the Invention

In recent years the dry charge storage battery has become an important part of the replacement battery market. This battery is charged at the source of manufacture, shipped to the dealer without electrolyte and activated at the time of use as a substantially "fresh" battery by merely filling with acid electrolyte. With this battery some of the problems associated with the maintenance and aging of fully charged, wet batteries stored in the dealer's inventory are eliminated and the return of over-age batteries from the field are reduced, especially from dealers with slow inventory turnover.

The manufacture of dry charge storage batteries creates economic and technical problems in the drying of the plate assemblies after they have been charged or formed. Heretofore, it has been deemed essential to thoroughly dry the plate assemblies after charging to prevent the battery from losing its charge during storage so as to become incapable of satisfactory electrical operation upon activation.

2. Description of the Prior Art

Several prior art techniques have been used to accomplish this drying. In one prior art method, the battery elements are formed, washed to remove the forming acid and then placed in a heating chamber and dried in a nonoxidizing atmosphere or with heated air. When the heated air is used, such as in the process described in U.S. Pat. No. 2,880,520, an extremely high velocity stream thereof, with the associated cost for obtaining same, must be used to prevent harmful oxidation of the negative plates. After drying, the battery elements are installed into battery containers, electrically connected and a cover is bonded onto the container. This method is costly and extremely time consuming because, in addition to the multiple steps involved, the charged and dried battery elements are frequently damaged from handling and/or during the installation and electrical connection steps. Consequently, the scrapped battery elements include the process costs for charging and drying under controlled atmospheric conditions which cannot be recovered.

In another prior method, the negative and positive plates are formed and dried prior to being assembled into battery elements. The additional handling and assembly steps after formation and drying results in even higher scrap rates with concomitant costs. Another disadvantage of these two methods is that the integrity of the internal electrical connections cannot be tested after assembly by a short high current discharge as is typically performed on fully charged wet batteries.

A further prior art method overcomes some of the above disadvantages by utilizing a technique wherein the battery elements are installed into the battery container and the electrical connections made prior to the formation and drying steps. U.S. Pat. No. 3,314,158 discloses such an in-container technique for formation and drying. As disclosed in that patent, this in-container formation and drying requires the use of a heated, nonoxidizing gas which is impinged onto the top of the battery elements. In order to insure that the residual moisture is adequately removed from the battery elements in a reasonable time, the velocity of the gas blown into the cell compartments must be extremely high, preferably about 21,000 feet per minute. In addition to the initial cost and operating expense of the equipment required to provide this high velocity flow, the force resulting from the impingement of the high velocity gas onto the battery elements can cause considerable damage to the separators, especially those made from thin materials such as paper. Also, control of the temperature and composition of the heated gas to obtain a uniform product on a mass production basis is very difficult.

The present invention involves a method whereby the advantages of in-container formation and drying are obtained and the requirement for using a high velocity gas for drying is eliminated.

SUMMARY OF THE INVENTION

The primary object of this invention is to provide an improved, inexpensive method for processing a charged storage battery which is activated by adding electrolyte, and the battery produced thereby.

Another object of this invention is to provide such a method where the storage battery produced thereby has improved low temperature activation performance characteristics.

Another object of this invention is to provide such a method whereby the necessity for complete drying is eliminated.

Another object of this invention is to provide a method for making a charged storage battery, and the battery produced thereby which is activated by the addition of electrolyte, wherein the integrity of the internal electrical connections of the battery can be tested by a high current discharge after the battery elements have been formed.

Another object of this invention is to provide a method, and the charged storage battery produced thereby, wherein in-container formation is utilized but the use of high velocity gases for removing residual moisture from the battery elements is eliminated.

Other objects, aspects and advantages of this invention will become apparent to those skilled in the art from the following detailed description and appended claims.

The method of this invention includes the steps of installing assembled battery elements into the container cell compartments of a storage battery; electrically connecting the battery elements; filling the cell compartments with forming electrolyte; charging or forming the battery elements to a fully charged state; removing about 70 to about 97 (preferably about 77 to about 87) weight per cent of the forming acid based upon the total weight of the forming acid in the battery after completion of formation, by applying an accelerative force (preferably a centrifugal force) to the battery; and installing means to seal the battery against the ingress of air into the cell compartments. After conventional finishing steps, such as cleaning and decorating, the battery is ready for activation which is effected by merely removing the sealing means and filling each cell compartment with conventional activating electrolyte.

In a preferred embodiment, the low temperature activation performance of the battery is improved further by allowing the battery elements to stand in the forming acid after the forming step for a time sufficient for some self-discharge of the positive plates and then applying a boost charge to the battery elements to bring them to a fully charged state prior to removing the forming acid. In one embodiment, the cover is installed and bonded onto the container after the forming acid has been removed therefrom by an accelerative force. Another embodiment, the cover is installed and bonded onto the container prior to filling the cell compartments with forming acid.

In addition to incorporating the advantages of in-container formation, i.e., the elimination of handling and performing assembly steps on the battery elements after formation, the method of this invention substantially reduces the expense and other problems associated with the use of high velocity gas drying heretofore employed in conventional dry charged processes. Also, a high current discharge test to determine the integrity of the internal electrical connections can be performed after the forming step thereby providing the capability of detecting defects during the process. Furthermore, and quite unexpectedly, it has been found that the low temperature activation performance of the batteries of this invention is significantly superior to that of batteries processed by conventional dry charged processes.

The process of this invention is particularly adaptable for the production of fully charged batteries which are shipped to the dealer without electrolyte and activated at the time of use as a substantially "fresh" battery by filling with acid electrolyte. However, it should be understood that the simplicity and inexpensiveness of the process allows the battery fabricator to use it advantageously for in-house manufacturing of wet batteries. The seasonal nature of the battery market requires the fabricator to build up substantial inventories of wet batteries during slack periods in order to accommodate peak periods of demand. A wet battery typically loses some of its charge during storage; therefore, a boost charge is frequently applied to those wet batteries which have been in inventory for some time prior to shipment to the dealer. Also, wet batteries tend to age during storage. With the process of this invention, a fabricator can stock pile fully charged batteries and ship them as substantially "fresh" wet batteries to the dealer by merely adding electrolyte to the battery shortly before shipment.

DESCRIPTION OF THE PREFERRED EMBODIMENTS

The battery of this invention includes a conventional multicell container having a plurality of partition walls molded integrally with the container to form cell compartments. Battery elements of conventional design, including positive and negative plates alternately arranged with suitable separators and straps of opposite polarity electrically connected to the respective positive and negative plates of each element, are installed into the cell compartments. The elements in the end cell compartments are provided with terminal posts which extend either upwardly through the battery cover or through an outside container wall for external electrical connection in the circuit in which the battery is to be used. The straps connecting the respective positive and negative plates of each element are provided with upstanding connector lugs. The straps and connector lugs are cast to the plates by any suitable method and apparatus, such as that described generally in U.S. Pat. No. 3,087,005 and 3,253,306 or by gas burning methods.

After the elements are installed into the cell compartments, the positive plates of one element are electrically connected to the negative plates of the element located in the adjacent cell by joining the respective connector lugs in a conventional manner, preferably by joining the connector lugs together in an aperture in the partition, such as by the method generally described in U.S. Pat. No. 3,313,658.

After the intercell connections have been made, the battery is then formed or charged in a conventional manner. Preferably, this step is performed without the cover installed and bonded onto the container; however, it is within the scope of this invention to install and seal the cover onto the container prior to the forming step. The cell compartments are filled with conventional forming battery electrolyte, e.g., sulfuric acid having a specific gravity of 1.100, and the battery is connected in a charging circuit, generally in series with a number of other batteries. The batteries are then fully charged. After formation, a high current discharge test can be run to determine the integrity of the internal electrical connections.

In one embodiment, the forming acid is removed by an accelerative force after formation as described hereinafter. Although it has been found that the battery produced by such a process has low temperature activation performance characteristics superior to those produced by conventional dry-charged processes, the low temperature activation performance can be improved further by allowing the elements to stand in the forming acid for a period of time sufficient for some self-discharge of the positive plates and then applying a boost charge to the battery elements. Therefore, the latter procedure is preferred.

Although not completely understood at this time, it is believed that a thin layer of small crystals of lead sulfate forms around the grid bars during the stand period. Generally, the stand time can be in the range of about 1 hour to about 72 hours, preferably from about 8 to about 48 hours. The stand time will vary depending upon the composition of the active material and the size, configuration and composition of the grids. The lower limit for the stand time is apparently that time necessary to form a thin layer of lead sulfate around the grid bars, the presence of which can be determined by conventional analytical techniques such as by photomicroscopic analysis. The upper limit for the stand time is governed primarily by processing considerations, i.e., is usually a multiple of a normal 8-hour shift for ease of production control. Stand times of longer than 72 hours can be used; however, it has been found that the negligible performance improvement obtained thereby does not warrant the cost of the additional time.

After completion of the stand time period, a boost charge is applied to the battery elements to charge them to a fully charged state. During this boost charge, it presently appears that the layer of lead sulfate, believed to be formed around the grid bars during the stand period, is converted to a dense, relatively impervious coating of lead dioxide. It further appears that this lead dioxide coating minimizes the penetration of the retained forming acid to the grid-lead dioxide interface of the positive plate, thereby preventing, or at least minimizing, self-discharge thereof during storage. Generally, a boost charge in the range from about 2 to about 10 amps for a time period in the range from about 1 to about 3 hours is sufficient to recharge typical automotive battery elements to a fully charged state.

Either after the forming step or after the above "stand and boost" technique, depending upon the embodiment practiced, the battery is preferably inverted and the majority of the forming acid is drained therefrom. Generally, a draining time of about 1 minute is sufficient to drain as much forming acid as can be reasonably drained from the typical automotive battery by inversion. Since the battery is subsequently subjected to an accelerative force, it is not necessary to drain the battery at this stage in the process. However, it is usually advantageous to dump the majority of the forming acid from the battery prior to the application of the accelerative force for ease of production handling and to expedite the removal of the desired amount of acid.

The battery is then subjected to an accelerative force, preferably in a centrifuge, to remove the desired amount of forming acid from the plates and separators. The battery is subjected to the accelerative force at a sufficient $g$ force level and for a sufficient time to remove about 70 to about 97, preferably about 77 to about 87, weight per cent of the forming acid, based on the total weight of the forming acid in the battery after the forming step has been completed.

The particular $g$ force level and time required to remove the above quantity of forming acid for any particular type of battery can be determined with a minimum amount of routing experimentation. For instance, the battery with the elements installed, with or without the cover installed, is first weighed to determine its dry weight. Each cell compartment is then filled with forming acid to the full mark on the container. After the battery is formed, it is weighed again to determine its wet weight. The difference between the wet weight and the dry weight represents the total weight of forming acid in the battery at the completion of forming, including some sulfates in solution which are formed during the forming step. The $g$ force level and time required to remove the desired per cent of this quantity of forming acid for the particular batteries is then determined experimentally. After this determination is made, the same $g$ force level and time can be used for all batteries of that particular type.

It will be appreciated by those skilled in the art that the $g$ forces should be kept below that level which would cause mechanical damage to the battery elements. Of course, the $g$ force level and time is reduced substantially if the majority of the forming acid is drained from the battery and the cover is not installed prior to this step. However, in some situations the advantages of installing the cover prior to forming and/or eliminating the draining step may outweigh the additional time required to remove the desired amount of forming acid by the accelerative force.

As indicated above, centrifuging is the preferred method for applying the accelerative force to the battery for removal of the forming acid. The battery can be installed in many attitudes for the application of the centrifugal forces within the practical restriction that the slope of the cell walls permit the forming acid to flow out of the cell compartments from the resultant of the centrifugal and gravitational forces. For example, the battery can be positioned on its side with the top positioned away from the center of the centrifuge and the plates approximately paralleled to the radius from the center of rotation. In this attitude a fixture adapted to hold the elements in place during the centrifuge operation may be required since the centrifugal forces tend to move the plates outwardly from the cell compartments. As a guide, it has been found that, for an AABM Group 24, 70 ampere-hour automotive battery having paper separators positioned in this attitude, a centrifugal speed of 150 revolutions per minute for 5 minutes with the battery's center of gravity located about 22.5 inches from the center of centrifuge removes approximately 81 to 89 per cent of the forming acid.

The battery can also be rotated in a horizontal plane to a position where the plates are located at an angle to the radius from the center of rotation, e.g., at an angle of approximately 17° to 23°, so that the tops of the cell compartments face slightly in the direction of the centrifugal forces. Although a slightly higher centrifuge speed is required to remove the same amount of forming acid from the battery in this attitude, the above-mentioned fixture can be eliminated because the centrifugal force tends to press the plates against the cell compartment walls rather than moving them outwardly. It will be readily apparent to those skilled in the art that many other attitudes can also be used with the particular choice being a comprise between the centrifuge speed and time, the percentage of forming acid removed, the ease of loading and unloading the batteries, and the cost and complexity of holding fixtures.

As is well known, negative plates containing moisture within a certain range oxidize quite rapidly when exposed to the atmosphere. Such an oxidation reaction results in a loss of chemical energy stored in the plates and frequently results in a reduction of electrical capacity thereof to an unacceptable level when the battery is activated. Therefore, if the cover has not been installed prior to the forming step, it and/or the sealing means must be installed promptly after the centrifuge step to minimize excessive oxidation. The rate of negative plate oxidation can be minimized by limiting the amount of forming acid removed. For example, it has been found that, for the group 24 battery referred to above having about 11 to 19 per cent of the forming acid retained after being centrifuging at 150 r.p.m. for 5 minutes, the cover and sealing means can be installed up to 30 minutes after completion of centrifuging without an adverse effect. However, when centrifuged at 300 r.p.m. for 5 minutes, a rapid oxidation reaction occurs after about 15 minutes of exposure to the atmosphere, as evidenced by a sudden temperature rise in the elements and wisps of condensed water vapors emanating from the cells. Under these conditions it is impractical to obtain a measurement of the percentage of forming acid retained in the element; however, from measurements made in other batteries, it is estimated to be about 3 to 8 per cent. Therefore, we prefer leaving enough forming acid in the elements to prevent a runaway exothermic oxidation reaction from occurring within 30 minutes after completion of the centrifuge step. This time interval provides a reasonable time for performing the cover and sealing means installation steps.

A sufficient amount of forming acid should be removed from the battery elements to permit the achievement of the desired final specific gravity of the operating electrolyte after activation. The final specific gravity is a function of the volume of the activation electrolyte used, the concentration of the forming acid after formation, i.e., formed specific gravity, and the amount of forming acid remaining in the elements. Because of the practical problems associated with the user having different activation acids for conventional dry charged battery and batteries of this invention, it is preferred that sufficient forming acid be removed so that a conventional activation acid, i.e., acid having a specific gravity of 1.265, can be used. With a typical formed acid specific gravity of 1.130, we have found that, by controlling the removal of forming acid so that the amount retained in the elements is about 8 to about 15 per cent by weight, a final electrolyte specific gravity of 1.246 to 1.255, after discharge and charge cycling, can be obtained when an activation acid having a specific gravity of 1.265 is used. Similarly, with an activation acid having a specific gravity of 1.300, a final operating electrolyte having a specific gravity of 1.278 to 1.289 can be obtained. For situations where the use of more concentrated activation acids is acceptable, the amount of forming acid retained in the elements can be up to 30 per cent.

After the centrifuging step, the cover is installed and bonded to the container, if not done prior to the forming step, in any convenient manner, such as by heat sealing or by an epoxy adhesive and the sealing means is installed promptly thereafter as discussed above. The sealing means can comprise any convenient means capable of preventing the ingress of air into the cell compartments. For example, rubber diaphragms adapted to fit over the outer flange of the filling ports and generally conforming with inside of the filling wells have been found to provide adequate protection. With these diaphragms in place, the battery vent caps can be loosely installed into the filling ports. Other means, such as storing the battery in a bag made from a material having low oxygen permeability can also be used. If desired, the battery can be purged with a nonoxidizing gas prior to installation of the sealing means or stored in a sealed container filled with such a gas. However, it has been found that such a treatment is not essential for obtaining a battery having improved low temperature activation performance.

At the time of activation, the sealing means is removed and the activation electrolyte is poured into each cell compartment up to the full mark and the battery is ready for operation.

The following examples are presented to exemplify this invention and are not to be construed as limiting same.

EXAMPLE I

Several AABM Group 24, 70 ampere-hour automotive batteries having paper separators were processed in accordance with this invention. All batteries were formed at 9.5 amps for 19 hours in sulfuric acid having an initial specific gravity of 1.100. Groups of the batteries were allowed to stand in the forming acid after formation for various time periods, including one group from which the forming acid was dumped immediately after formation. All the batteries subjected to a stand time were charged with a boost charge of 5 amps for 2 hours after the stand period. All the batteries were centrifuged at 150 r.p.m. for 5 minutes with the center of gravity located approximately 22.5 inches from the center of the centrifuge. After being centrifuged, covers and terminal posts were installed on the batteries. All the batteries, except one from each group used as the control, were sealed in bags, a partial vacuum applied and stored at 120° F. to accelerate aging. Individual batteries from each group were removed from the bags after elapsed time periods, filled with activation acid and then discharged at 150 amps and 30° F. to determine the low temperature activation performance thereof. Table I shows the results of tests.

TABLE I

| No. of Run No. | Stand Time, hrs. | Days Stored at 120° F. | Voltage after 5 seconds | Time to 6.0 Volts, min. |
|---|---|---|---|---|
| 1 | 0 | - | 10.50 | 9.4 |
| 2 | 0 | 14 | 10.23 | 7.7 |
| 3 | 0 | 28 | 10.25 | 7.8 |
| 4 | 0 | 40 | 10.30 | 6.3 |
| 5 | 0 | 70 | 10.00 | 5.1 |
| 6 | 0 | 100 | 9.25 | 3.8 |
| 7 | 0 | 126 | 9.56 | 3.3 |
| 8 | 4 | - | 10.55 | 9.7 |
| 9 | 4 | 14 | 10.25 | 8.0 |

| | | | | |
|---|---|---|---|---|
| 10 | 4 | 28 | 10.20 | 7.7 |
| 12 | 4 | 70 | 10.00 | 5.3 |
| 13 | 4 | 100 | 9.57 | 4.7 |
| 14 | 4 | 126 | 9.80 | 5.0 |
| 15 | 12 | - | 10.56 | 9.9 |
| 16 | 12 | 13 | 10.20 | 7.4 |
| 17 | 12 | 28 | 10.32 | 7.4 |
| 18 | 12 | 40 | 10.40 | 6.9 |
| 19 | 12 | 70 | 10.10 | 5.3 |
| 20 | 12 | 100 | 10.10 | 5.0 |
| 21 | 12 | 126 | 10.01 | 4.8 |
| 22 | 24 | - | 10.57 | 10.5 |
| 23 | 24 | 13 | 10.60 | 9.1 |
| 24 | 24 | 28 | 10.38 | 8.1 |
| 25 | 24 | 40 | 10.00 | 7.2 |
| 26 | 24 | 70 | 9.88 | 5.0 |
| 27 | 24 | 100 | 9.33 | 5.3 |
| 28 | 48 | - | 10.57 | 10.4 |
| 29 | 48 | 13 | 10.60 | 8.7 |
| 30 | 48 | 28 | 10.34 | 7.7 |
| 31 | 48 | 40 | 9.77 | 6.0 |
| 32 | 48 | 70 | 10.40 | 7.9 |
| 33 | 48 | 100 | 10.30 | 5.8 |
| 34 | 48 | 126 | 10.10 | 5.7 | tivated with sulfuric acid having a specific gravity of 1.265 and the latter three batteries were activated with sulfuric acid having a specific gravity of 1.300. In comparison, the tests were more severe for the first three batteries because of the lower specific gravity activation acid used. All of the batteries were discharged at 285 amps and 30° F., then recharged and discharged at 380 amps and 0° F., and then recharged and discharged at 285 amps at −20° F. to determine the low temperature performance thereof. Table II shows the results of these tests.

TABLE II

| | 30° F. Activation Test | | | 0° F. Test | | S.G.[1] of acid after at boost | Time to 7.2 v. −20° F., min. | S.G.[1] of acid after voost |
|---|---|---|---|---|---|---|---|---|
| | S.G.[1] of activation acid | 15 sec. voltage | Time to 7.2 v., min. | S.G.[1] of electrolyte after boost | 30 sec. voltage | Time to 7.2 v., min. | | |
| Battery No.: | | | | | | | | |
| 1 | 1.265 | 9.42 | 3.05 | 1.240 | 7.95 | 1.36 | 1.247 | 0.88 | 1.250 |
| 2 | 1.265 | 9.44 | 2.94 | 1.241 | 7.95 | 1.34 | 1.246 | 0.82 | 1.250 |
| 3 | 1.265 | 9.40 | 3.02 | 1.240 | 7.95 | 1.36 | 1.245 | 0.86 | 1.248 |
| 4 | 1.300 | ---- | 0.39 | 1.293 | ---- | 0.35 | 1.294 | 0.23 | 1.302 |
| 5 | 1.300 | 8.13 | 1.19 | 1.290 | ---- | 0.43 | 1.297 | 0.33 | 1.305 |
| 6 | 1.300 | 8.06 | 0.74 | 1.297 | ---- | 0.30 | 1.290 | 0.14 | 1.297 |

[1] Specific gravity.

From these data it can be seen that batteries produced by this invention have excellent low temperature activation performance characteristics after being subjected to extended periods of accelerated aging. Generally, a time of 3.5 minutes to 6.0 volts is considered acceptable for dry charge batteries subjected to this activation test. As a rule of thumb, the aging resulting from storage at 120° F. is considered about equivalent to 3 times that resulting from normal on-shelf storage. Therefore, even with no stand and boost, the batteries produced in accordance with this invention exhibited acceptable performance after an on-shelf storage equivalent to about 10 months. It can be seen that an increase in stand time, along with a boost charge, results in higher performance. Tests have been performed with stand times up to 72 hours; however, the small improvement over a 48 hour stand is not considered sufficient to warrant the added cost for the longer stand time.

The improved low temperature activation performance of the battery of this invention becomes more apparent when compared to dry charge batteries produced by a conventional technique. A group of 34 dry charge batteries, wherein the plates were formed and dried prior to the assembly into elements, were subjected to the same low temperature activation test described above after being stored at 80° F. and 80 per cent relative humidity. Seventeen of the batteries were tested after 4 months and the other seventeen were tested after 8 months of such storage. The average time to 6.0 volts was about 3.5 minutes for the first set of batteries and about 2 minutes for the second set of batteries. Similar times for the batteries of Example I with equivalent storage times, as shown in Table I, are in excess of 6 minutes (runs 4, 11, 18, 25 and 31) and 4.5 minutes (interpolation between runs 5 and 6, 12 and 13, 19 and 20, 26 and 27, and 32 and 38), respectively.

EXAMPLE II

Low temperature activation tests were performed on three AABM Group 24, 70 ampere-hour automotive batteries processed in the same manner as described in Example I with a stand period of 24 hours and on three similar dry charge batteries processed by a conventional technique, i.e., plates were formed and dried prior to assembly into elements. All of the batteries were manufactured shortly before the tests without any substantial storage time. The first three batteries were ac- From these data it can be seen that the batteries processed in accordance with this invention (battery nos. 1–3) had substantially longer times to 7.2 volts than conventional dry charge batteries (battery nos. 4–6) in all three tests thereby indicating, not only superior low temperature activation performance, but also better retention of capacity at low temperatures. These data also show that the specific gravity of the operating electrolyte of the batteries of this invention reaches an acceptable level after a small number of discharge and charge cycles.

Although only several embodiments of this invention have been described for illustrative purposes, it is not limited thereto. Various modifications and alterations will be apparent to those skilled in the art without departing from the scope and spirit of the invention.

We claim:

1. A method for producing a fully charged battery capable of being activated by the addition of electrolyte which comprises a container having at least one cell compartment and at least one battery element composed of a plurality of positive and negative plates with separators disposed therebetween including the steps:
   a. installing said battery elements into said cell compartment;
   b. adding forming electrolyte to said cell compartment;
   c. forming said battery element;
   d. removing from about 70 to about 97 weight percent of said forming electrolyte, based on the total weight of the forming electrolyte in said battery after completion of the forming step, by applying an accelerative force to said battery; and
   e. installing sealing means onto said battery to prevent the ingress of air into said cell compartment.

2. The method according to claim 1 wherein said accelerative force is a centrifugal force.

3. The method according to claim 1 further comprising, after completion of step (c) but before step (d), allowing said battery element to stand in said forming electrolyte for a time period sufficient for said positive plates to self-discharge a finite amount and then boost charging said battery element to a fully charged state.

4. The method according to claim 3 wherein a cover having at least one filling port corresponding to said cell compartment is installed after step (d) but prior to step (e).

5. The method according to claim 3 wherein said stand time period is from about 1 hour to about 72 hours.

6. The method according to claim 3 wherein said accelerative force is a centrifugal force.

7. The method according to claim 4 wherein said sealing means is installed onto said filling port.

8. The method according to claim 6 wherein said stand time period is from about 1 hour to about 72 hours.

9. The method according to claim 8 wherein the amount of said forming electrolyte removed during step (d) is from about 77 to about 87 weight percent.

10. The method according to claim 9 wherein said boost charge is from about 2 to about 10 amps and is applied to said battery element for a time period from about 1 hour to about 3 hours.

11. A method for producing a fully charged storage battery capable of being activated by the addition of electrolyte which comprises a container having a plurality of cell compartments and a plurality of battery elements composed of a plurality of positive and negative plates with separators positioned therebetween including the steps:
   a. installing said battery elements into said cell compartments;
   b. electrically connecting said battery elements;
   c. filling each of said cell compartments with forming electrolyte;
   d. forming said battery elements;
   e. allowing said battery elements to stand in said forming electrolyte for at least 1 hour;
   f. boost charging said battery elements to a fully charged state;
   g. removing from about 70 to about 97 weight percent of forming electrolyte, based upon a total weight of the forming electrolyte in said battery after completion of the forming step, by applying an accelerative force to said battery;
   h. installing a cover having at least one filling port corresponding to each cell compartment onto said container; and
   i. installing sealing means onto said battery to prevent the ingress of air into said cell compartments.

12. The method according to claim 11 wherein said accelerative force is a centrifugal force.

13. The method according to claim 11 wherein the amount of said forming acid removed during step (g) is from about 77 to about 87 weight percent.

14. The method according to claim 12 wherein said sealing means is installed over said filling ports.

15. The method according to claim 12 wherein said stand time period is from about 8 hours to about 48 hours.

* * * * *

UNITED STATES PATENT OFFICE
CERTIFICATE OF CORRECTION

Patent No. 3,652,341            Dated March 28, 1972

Inventor(s) Vincent Michael Halsall and Edward Norman Mrotek

It is certified that error appears in the above-identified patent and that said Letters Patent are hereby corrected as shown below:

Column 7, between lines 1 and 2 insert--

| 11 | 4 | 40 | 10.30 | 6.9--. |

Column 8, line 19, "1,241" should be--1.241--.

Column 8, line 22 "1,290" should be--1.290--.

Signed and sealed this 3rd day of April 1973.

(SEAL)
Attest:

EDWARD M. FLETCHER, JR.           ROBERT GOTTSCHALK
Attesting Officer                Commissioner of Patents